Figure 1A:
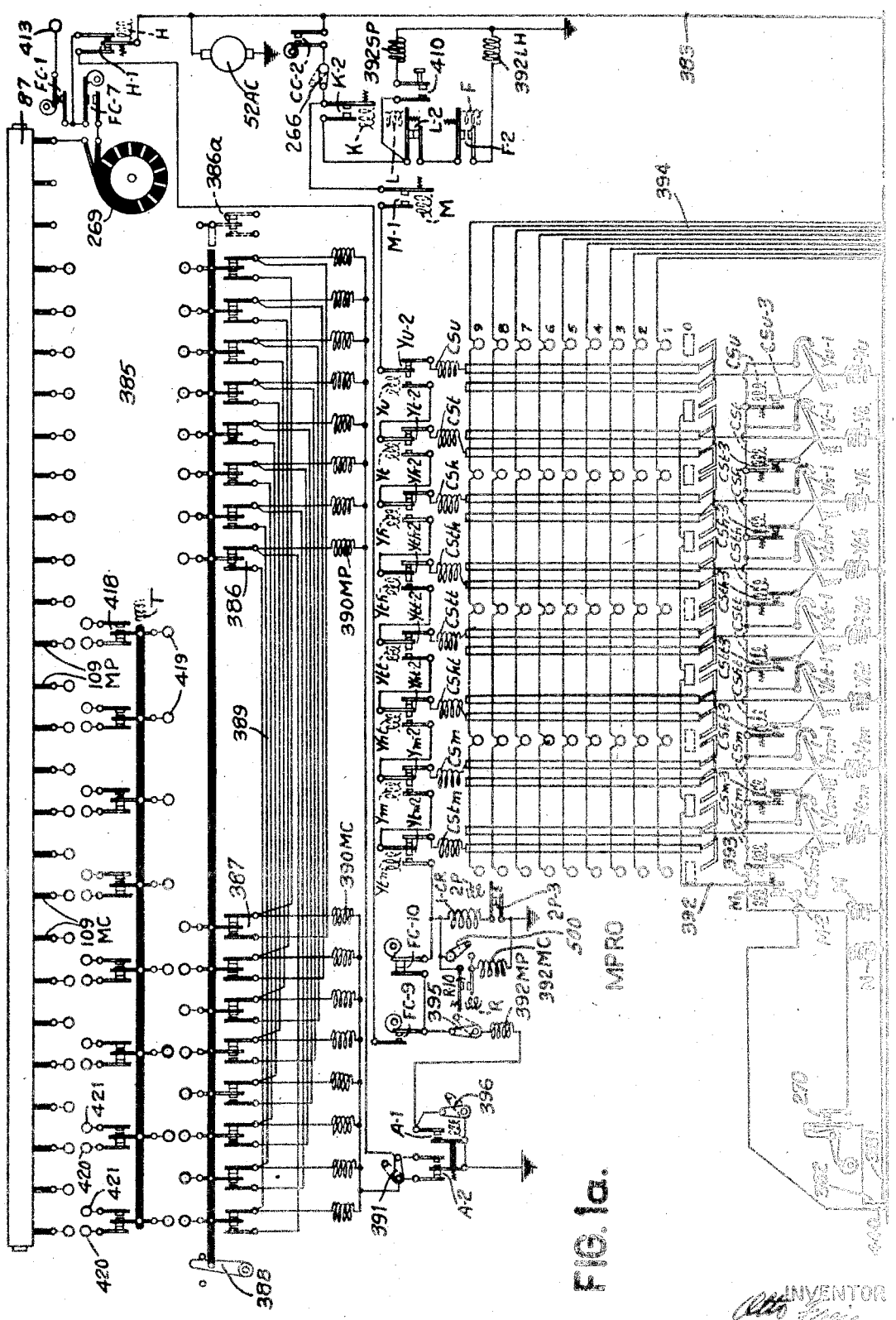

Jan. 14, 1941. O. FREI 2,228,307
ACCOUNTING MACHINE
Filed Aug. 18, 1938 6 Sheets-Sheet 1

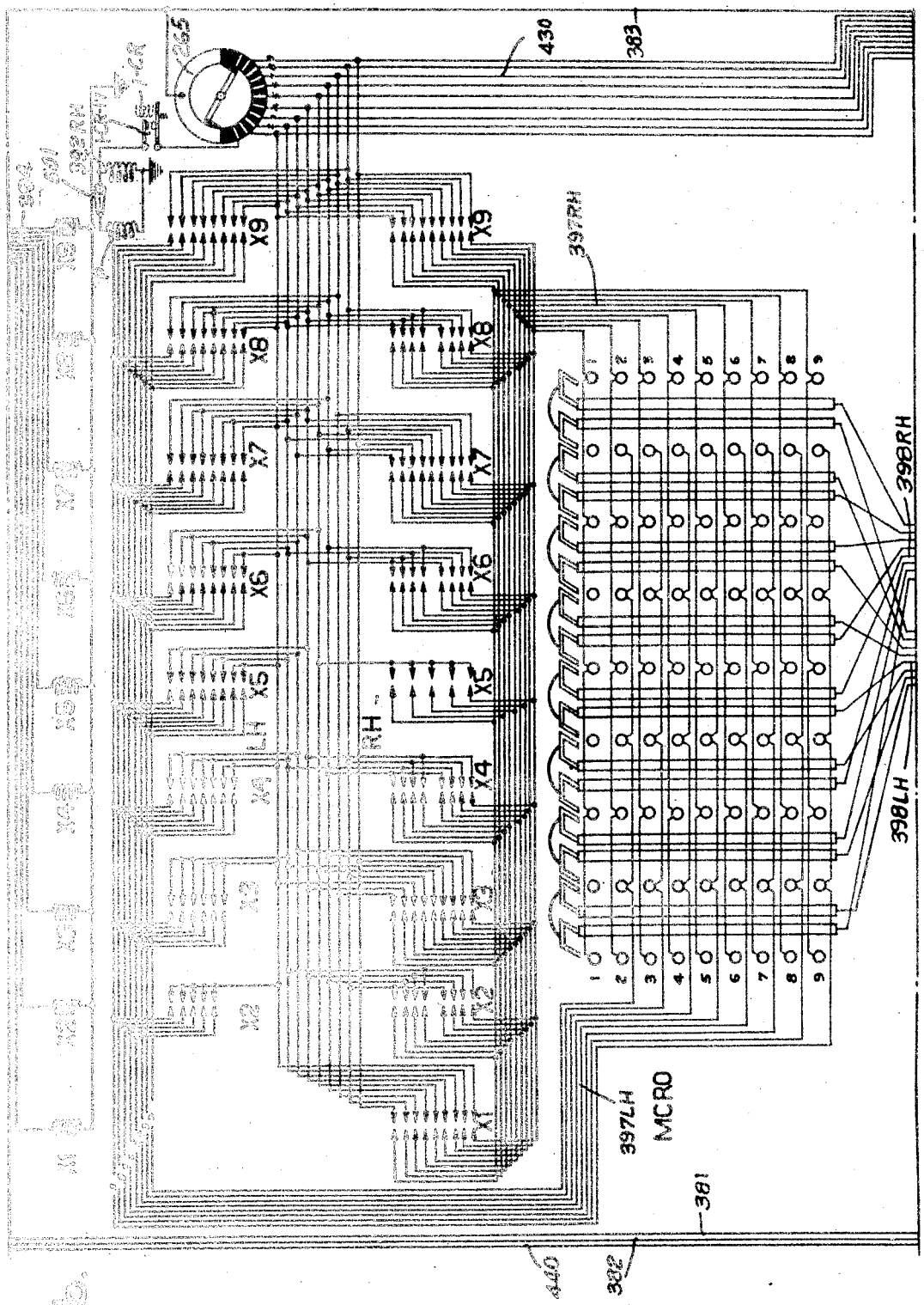

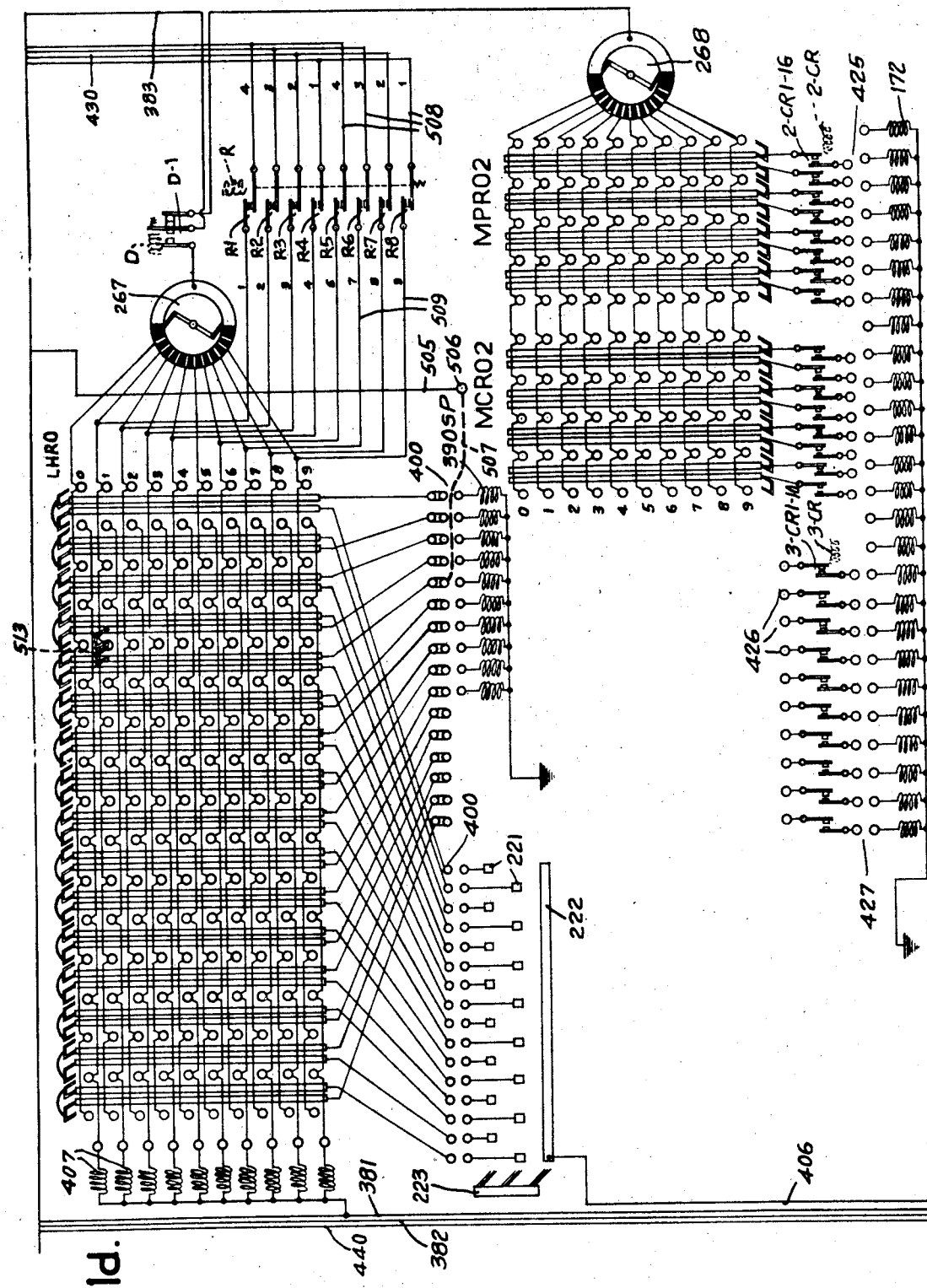

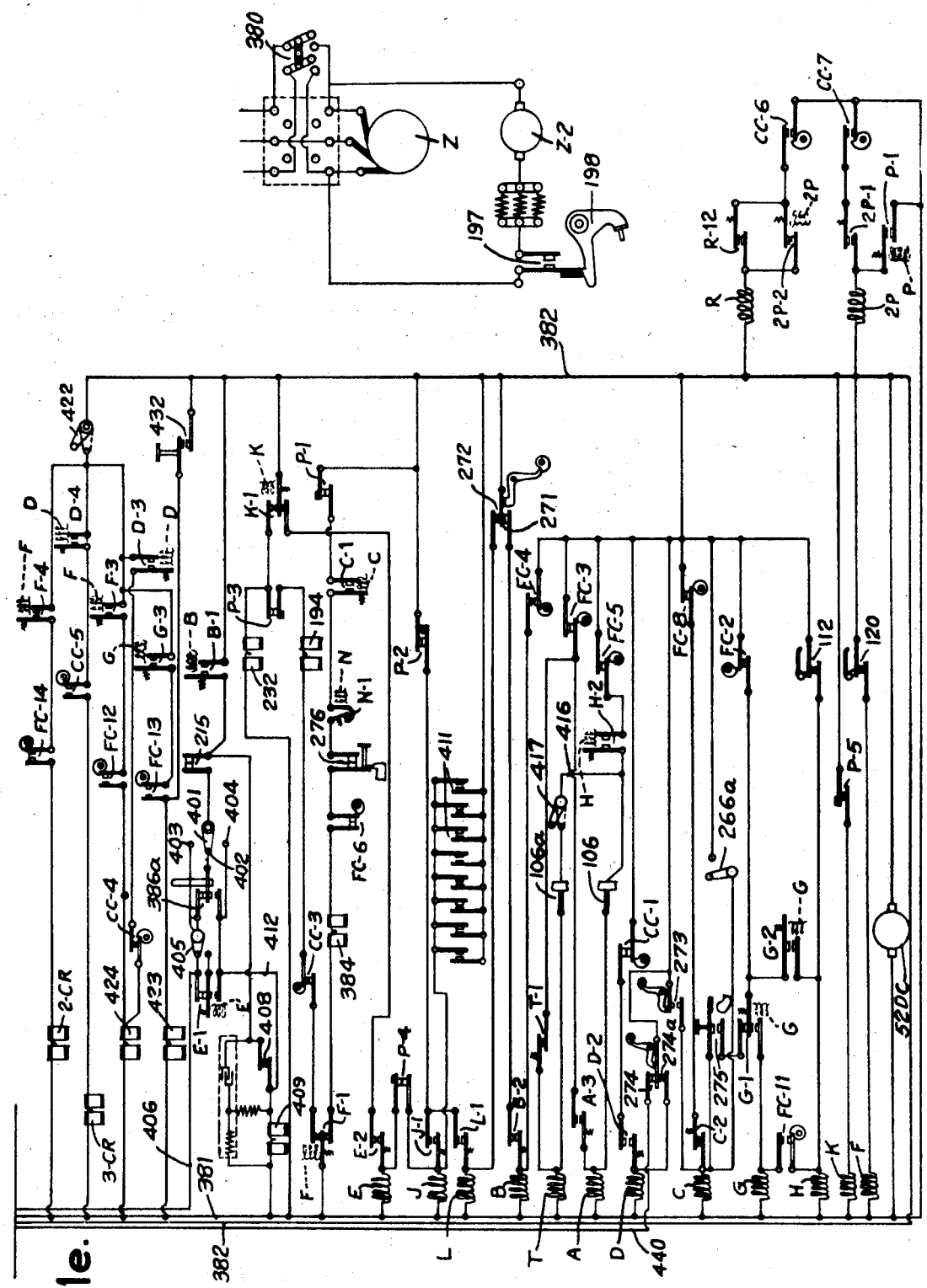

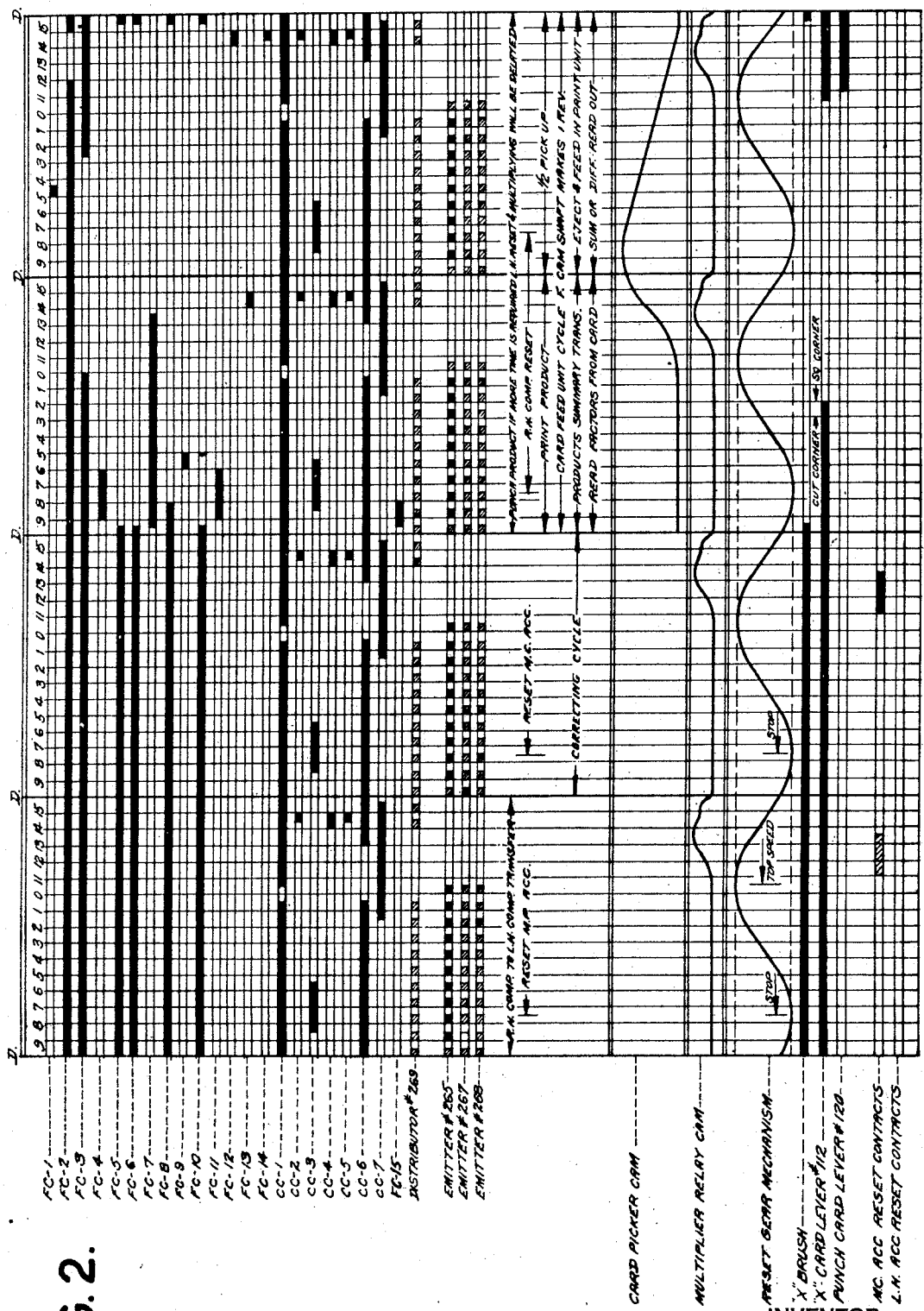

Patented Jan. 14, 1941

2,228,307

UNITED STATES PATENT OFFICE 2,228,307

ACCOUNTING MACHINE

Otto Frei, Basel, Switzerland, assignor to International Business Machines Corporation, New York, N. Y., a corporation of New York Application August 18, 1938, Serial No. 225,527

5 Claims. (Cl. 235—61.6)

This invention relates to accounting machines and more particularly to accounting machines in which multiplying operations are performed. The invention is particularly concerned with the accumulating mechanism in which the product obtained during computing operations is set up.

The principal object of the invention is to provide mechanism for automatically rounding out the resulting product to the next higher multiple of "5," that is, to raise the lowest order to be read out of the accumulator to the next higher 5 or 0 if such order is not already standing at 5 or 0.

A more specific object of the invention is to provide means for testing the digital setting of any denominational order of an accumulator and effect an additional entry to raise the digital value to 5 if the setting is from 1 to 4 inclusive or to raise the value to 10 if the setting is from 6-9 inclusive. Where the accumulator order already stands at 5 or 0, no additional amount is entered.

A more specific object of the invention is to provide mechanism for adjusting the setting of any selected accumulator order wherein the true product digit is set at 0 to 5 when any order lower than the selected order contains any significant digit.

In the drawings:

Figs. 1a, 1b, 1c, 1d, 1e taken together and arranged vertically in the order named show the complete circuit diagram of a multiplying machine including the alterations required to carry out the objects of the invention.

Fig. 2 is a timing diagram of a number of cycles of operations of the machine to show the relative timing of additional circuit closing devices added for the purposes of the present invention.

The machine to which the present invention has been applied is that shown and described in the patent to G. F. Daly, 2,045,437, granted June 23, 1936. Reference may be made to this patent for more detailed explanation of the operation of the machine so that the description herein may be confined to a brief outline of the procedure involved. The changes in such procedure necessary to carry out the invention are all concerned with the rearrangement of the circuits of the machine and, in order to point out wherein such changes have been made, the circuit diagrams (Figs. 1a to 1e) are reproductions of the circuit diagrams (Figs. 20a to 20e) of the patent with the same reference characters applied to the parts so that ready reference may be made to the disclosure of the patent for an explanation of any of the known mechanism and the description herein may be confined to an explanation of the improvements made. A brief description will first be given of the operation of the machine in the performance of its normal multiplying operations.

Record cards bearing perforations representing a multiplicand and a multiplier are advanced singly to pass sensing brushes 109 (Fig. 1a) which, through suitable plug connections cause the multiplier amount to control adding magnets 390MP and effect a set-up of the multiplier on the device designated MPRO. At the same time the multiplicand amount is caused to control the adding magnets 390MC which effect a set-up of the multiplicand amount on the device designated MCRO (Fig. 1b). Following the sensing of the card, it is advanced to a punching mechanism where it awaits the completion of the computing operations, upon which, the product is punched back into the card. The MPRO device controls the computing mechanism to cause it to perform a cycle of operations for each significant digit in the multiplier and for each such digit one of the multiplying relays designated X1 to X9 (Fig. 1b) is energized each multiplying cycle to close a set of related relay contacts, whereby the emitter 265 emits impulses through the multiplying relay contacts to the MCRO device from which circuits branch to groups of wires 398LH and 398RH (Fig. 1c) and column shift relay contacts 131, 132 to the adding magnets 390LH and 390RH of the LH and RH partial product accumulators respectively.

When a multiplying cycle of operations has been performed for each significant multiplier digit, a relay magnet 1—CR (Fig. 1a) is energized to close its contacts 1—CR—1—16 (Fig. 1c) thereby connecting the device RHRO to the accumulator magnets 390LH so that the amount standing in the RH accumulator will be entered into the LH accumulator to obtain the final product in the latter. Concurrently with this transfer operation, the multiplier and multiplicand accumulators are reset and the resetting in the multiplicand accumulator will initiate a punching operation wherein the final product now set up in the device designated LHRO (Fig. 1d) controls the operation of punch selecting magnets 401 to punch the amount back into the record card.

While punching is being effected, the next following card traverses the sensing brushes and its multiplier and multiplicand amounts are entered into the multiplier and multiplicand accumulators in readiness for a further series of multiplying operations. Also concurrently with the punching operations, the RH accumulator is reset and, when punching is completed, the card is ejected, the LH accumulator is reset and multiplying operations take place for the following card. This briefly constitutes the sequence in which multiplying operations are normally effected by the machine and is the same as explained in detail in Patent 2,045,437.

When it is desired to round out the product before it is punched, the machine is arranged so that the magnet 392MC which controls resetting of the multiplicand accumulator (Fig. 1a) is not energized concurrently with the magnet 1—CR upon the completion of multiplying operations. This is effected by opening normally closed switch 500 so that the magnet 392MC will not be energized until relay contacts R10 close and, since the initiation of the punching operations is dependent upon the resetting of the MC accumulator, such punching operations will be suspended. In addition to switch 500, the relay contacts R10 and contacts 2P—3 are included in the circuit for the purpose of the present invention as shown in Fig. 1a.

In Fig. 1b the relay magnet P and switch 501 are provided, the switch being closed in order to effect energization of relay magnet P concurrently with the energization of the reset magnet 392RH of the RH accumulator.

Figure 1C:
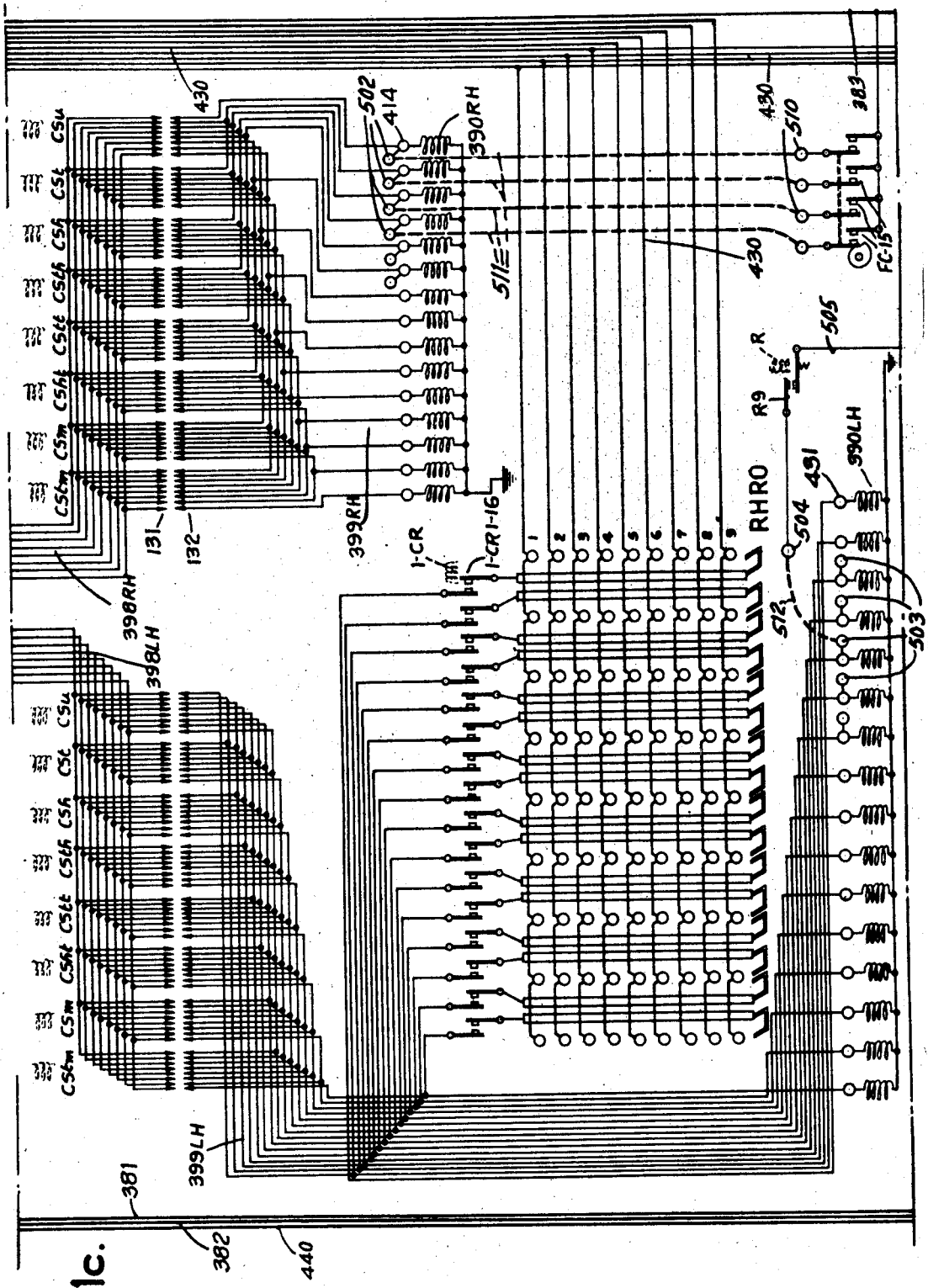

In Fig. 1c the accumulator magnets 390RH are provided with plug sockets 502 and the accumulator magnets 390LH are provided with plug sockets 503. A further plug socket 504 is provided which, through relay contacts R9 and wire 505 of Fig. 1d is connected to a plug socket 506. The plug socket 506 is connected by a plug connection 507 to the socket 400 in the denominational order of the LHRO device in which the rounding out or correction is to be effected.

A set of relay contacts designated R1 to R8 are connected through wires 508 to the wires 430 which extend upwardly to the emitter 265 (Fig 1b) and through wires 509 to the read-out positions of the LHRO device designated 1, 2, 3, 4, 6, 7, 8 and 9.

In Fig. 1c there is provided a set of cam contacts designated FC15 which are concurrently operated by a suitable cam. These contacts are provided with plug sockets 510 from which plug connections 511 may be made to plug sockets 502.

In the lower right hand portion of Fig. 1e is shown the added relay magnets R and 2P with their controlling circuit connections.

The operation of the invention may best be explained by tracing the sequence of operation involved in connection with a particular problem. Where it is desired to round out the digit in any particular denominational position without regard to the digits of the lower order, the contacts FC15 of Fig. 1c are not utilized and the plug connections 511 are not made. A plug connection 512 is made between socket 504 and socket 503 in the order of the LH accumulator in which the digit is to be adjusted and a further plug connection 507 (Fig. 1d) is made from socket 506 to the socket 400 of the same accumulator position. With these two connections made, the machine will operate as normally to sense the factors from the card, enter them into the MP and MC accumulators and obtain the partial products in the RH and LH accumulators.

Upon completion of multiplying, the magnet 1—CR (Fig. 1a) is energized but without accompanying energization of magnet 392MC. Since switch 500 is open and contacts R10 are normally open, the RH to LH transfer operation takes place alone and at the end of this operation the complete product will stand in the LH accumulator.

Near the end of this cycle a circuit is completed (Fig. 1b) from line 383 through emitter 265, relay contacts 1—CR—17 to energize the magnet 392RH which effects resetting of the RH accumulator. With switch 501 closed, the relay magnet P is also energized at this time and will cause closure of its contacts P—1 (Fig. 1e) to complete a circuit through the relay magnet 2P which in turn closes its contacts 2P—1 to provide a holding circuit through contacts CC7 which are closed at this time as indicated in Fig. 2. Relay magnet 2P will open its contacts 2P—3 (Fig. 1a) to prevent the transfer relay 1—CR being energized a second time in the next following cycle. The magnet 2P will also close its contacts 2P—2 (Fig. 1e) to complete a circuit through the relay magnet R whose contacts R12 close and hold the relay energized through cam contacts CC6 which are timed to maintain the circuit throughout the entering portion of the following cycle. Accordingly, at the beginning of the cycle following the RH to LH transfer, relay magnet R is energized, causing closure of its contacts R10 (Fig. 1a) and relay magnet 2P is energized so that its contacts 2P—3 are opened. Near the end of this cycle when the cam contacts CC—2 close, and energizing circuit for the MC reset magnet 392MC will be traceable from line 383, contacts CC—2, (Fig. 1a) switch 266, contacts M—1, serially through the left hand contacts Yu—2 to Ytm—2, contacts R10 and magnet 392MC to ground.

In this manner the resetting of the MC accumulator is delayed for a cycle, during which the brush of emitter 265 (Fig. 1b) traverses its segments and sends impulses through the wires 430 to contacts R1—R8 (Fig. 1d). The connections between the readout segments of the LHRO device and wires 430 is such that the "1" segments are connected to the "4" wire 430, the "2" segments to the "3" wire, the "3" segments to the "2" wire, and the "4" segments to the "1" wire. Thus, these four segment positions are connected to the wires 430 representing the "5" complement. The segments 6, 7, 8 and 9 are connected respectively to the 4, 3, 2 and 1 wires 430 representing the "10" complement of these four positions. Assuming, for example, that the selected order of the LHRO device is set to represents a "1." Accordingly, at the "4" time in the cycle a circuit will be traceable from line 383 to emitter 265, the "4" wire 430 (Figs. 1c and 1d), uppermost wire 508, contacts R—1, uppermost wire 509 to the readout brush in the "1" position shown in dotted lines designated 513 to the related socket 400, plug wire 507, socket 506, wire 505 (Fig. 1c), contacts R9 now closed, socket 504, connection 512, socket 503, magnet 390LH of the same order, and thence to ground. In this manner a 4 is added to the 1 standing in the order raising it to 5. In the same manner, if the brush 513 stood at 2, 3 would be entered, if it stood at 3, a 2 would be entered, if it stood at 4, a 1 would be entered. If it stood at 5 or 0 it would remain undisturbed. If it stood at any position from 6 to 9 inclusive, it would be advanced to 0, the normal carry mechanism of the accumulator causing a "1" to be added to the next higher order.

At the end of the cycle, through the circuit traced, the MC accumulator magnet 392MC is energized and from this point on operations take place in the usual manner as set forth in the patent referred to and the amount punched back into the card will be the amount now standing in the LH accumulator with the correction. The practice in punching the result would be to connect only the corrected and higher order columns and to disregard the lower orders. Thus, for example, if the true product standing in the LH accumulator were say, for example, the number 58632175 and the correction were effected in the position containing the 3, the correcting mechanism would change the setting of the accumulator to read 58652175 and would be connected for punching in only the higher order columns so that the result punched would be 5865.

In cases where cognizance is to be taken of the presence of significant digits in orders lower than the corrected order, especially where the order to be corrected initially stands at 5 or 0, the machine performs in the following manner. As a preliminary, plug connections 511 (Fig. 1c) are made between sockets 510 and sockets 502 related to the orders lower than the order to be corrected. The contacts FC15 (Fig. 2) are timed to close at the "9" time during the period in the card feeding cycle of operations during which the card is sensed for the multiplier and multiplicand amounts, so that at such time circuits are completed from line 383 (Fig. 1c) to contacts FC15, sockets 510, connections 511, sockets 502 to the adding magnets 390RH of the RH accumulator and thence to ground. This will cause the entry of a series of 9's into the selected orders. Thus, if a complete product would ordinarily stand in the LH accumulator, such as 34500001 with the fifth column from the right to be corrected, the effect of entering 9's in the four lower orders would cause the accumulator to now stand at 34510000 so that now, when correction is effected as explained, the accumulator will read 34550000, there having been a 4 added to the corrected column.

| Similarly for a true product | 34507218 |
| the added | 9999 |
| will result in | 34517217 |
| which will correct to | 34557217 |
| and the amount punched will be | 3455 |
| and also, | |
| for a true product | 34567218 |
| the added | 9999 |
| will result in | 34577217 |
| which will correct to | 34607217 |
| and the amount punched will be | 3460 |

It is thus apparent that the machine may be set to correct or round out the digit in any denominational position of the LH accumulator independently of the presence of significant digits in lower orders, or by effecting the preliminary entry of 9's in the lower orders may cause the column selected for rounding out to be advanced one digit before the rounding out is effected, thus taking into account the presence of significant digits in the lower orders.

Referring to the timing chart in Fig. 2, the second cycle shown represents the correcting cycle which for the purpose of the present invention is interposed between the cycle in which the RH to LH transfer takes place and the card feeding cycle, and it is indicated in this cycle that the MC accumulator resets at such time and that the MC accumulator reset contacts whose timing is indicated at the bottom of the correcting cycle close at such time rather than in the previous cycle where the timing is indicated by section lines.

While there has been shown and described and pointed out the fundamental novel features of the invention as applied to a single modification it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In an accounting machine, an accumulator, means for entering an amount therein, means settable by a denominational order element of said accumulator to represent the valve of the digit standing in said denominational order, and means controlled by said settable means when the digit represented thereby is other than 5 or 0, to cause the part of said entering means related to said order to add the 5-complement of the digit when it is less than 5 and the 10-complement of the digit when it is more than 5 into the order containing said digit thereby raising the initial amount to the next higher 5 or 0 value.

2. A multiplying machine having means for receiving a pair of factors, left hand and right hand partial product accumulators with entering means therefor and multiplying means for multiplying said factors to obtain the partial products in said accumulators together with means for transferring the partial product in the right hand partial product accumulator to the left hand partial product accumulator to form the complete product in said left hand partial product accumulator, in combination with means for causing the part of the entering means of the right hand partial product accumulator related to a selected order to enter a 9 in said selected order thereof prior to the operation of said transferring means whereby after the transfer operation, the next higher order of the complete product in the left hand partial product accumulator will be one unit greater if said left hand accumulator had received a significant entry in a denominational position corresponding to said selected order, means settable by said next higher order to represent the value of the digit standing therein, and means controlled by said settable means if it stands at other than 5 or 0 for causing the part of the entering means related thereto to add an amount in said higher order sufficient to advance the same to the next 5 or 0 position.

3. In a machine of the class described, an accumulator, entering means therefor, to enter an amount therein, a readout device controlled by the accumulator, settable to represent the amount standing therein, an emitter for controlling a part of said entering means to enter a digit into the lowest significant order of said accumulator and means controlled by the part of said readout means related to said order, when the amount standing in the accumulator is not exactly divisible by 5 for causing said emitter to control said part of the entering means to add thereto a digit sufficient to increase the initial amount to the next higher value divisible by 5.

4. In an accounting machine, an accumulator, means for entering an amount therein, means selectively settable to control a part of the entering means related to a selected order of said accumulator, a readout device settable by said selected order to represent the digit standing therein, and means controlled by the readout device of said selected order of the accumulator through said settable means when the value represented by the readout device of said selected order and higher orders is not exactly divisible by 5 for causing the said part of said entering means to increase the said value to the next higher multiple of 5.

5. A multiplying machine having means for receiving a pair of factors, left hand and right hand partial product accumulators with entering means therefor and multiplying means for multiplying said factors to obtain the partial products in said accumulators together with means for transferring the partial product in the right hand partial product accumulator to the left hand partial product accumulator to form the complete product in said left hand partial product accumulator, in combination with a 9's impulse emitter, selectively adjustable connections between said emitter and the part of the entering means of the right hand partial product accumulator related to a selected denominational order and all lower orders, said emitter being operative before the partial product has been obtained in said right hand partial product accumulator to enter a 9 in each of said selected orders whereby, after the transfer operation, the left hand partial product accumulator will contain the complete product increased by the addition of the entered 9's, means settable by the denominational order element related to the order next in order to the highest order in which a 9 has been added, to represent the value of the digit standing in said denominational order, and means controlled by said settable means when the digit represented thereby is other than 5 or 0, to cause the part of said entering means related to said order to add the 5-complement of the digit when it is less than 5 and the 10-complement of the digit when it is more than 5 into the order containing said digit.

OTTO FREI.